Aug. 18, 1942.    E. WAINER    2,293,089
REFRACTORY
Filed April 1, 1940
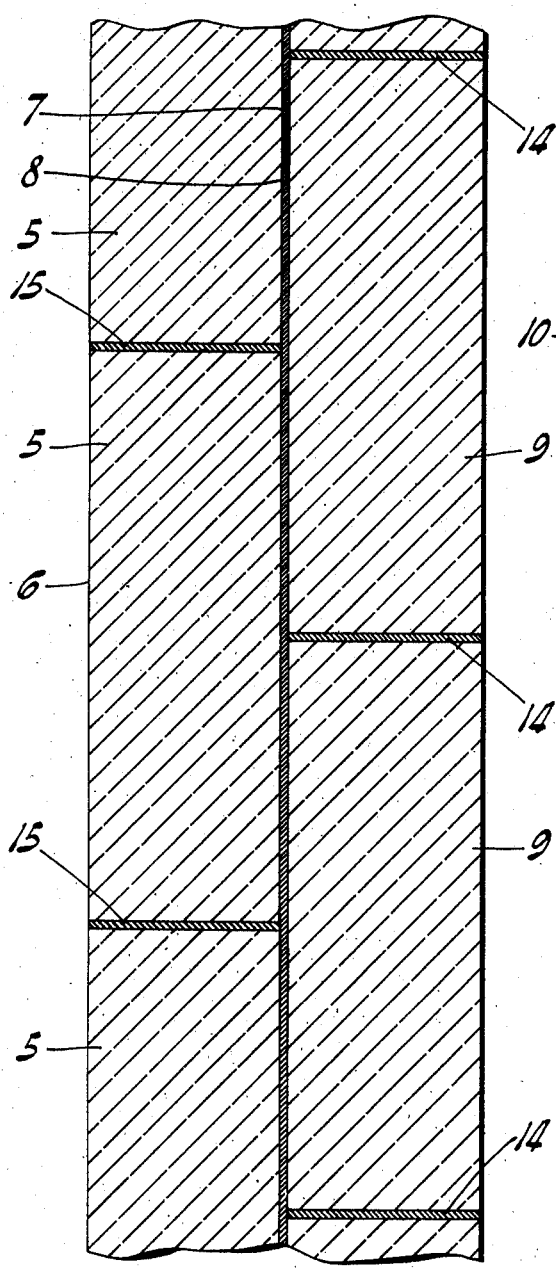
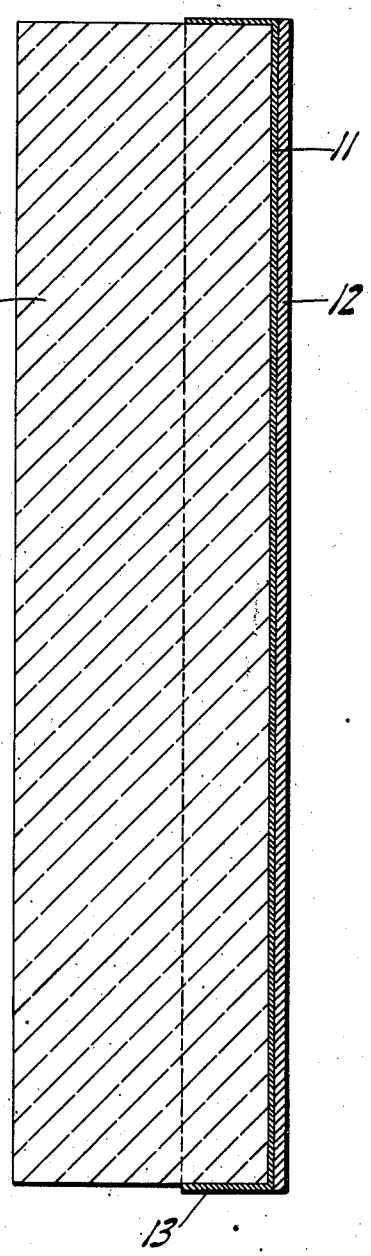
INVENTOR
EUGENE WAINER,
BY
Bean, Brooks, Buckley & Bean.
ATTORNEYS Patented Aug. 18, 1942

2,293,089

UNITED STATES PATENT OFFICE 2,293,089

REFRACTORY

Eugene Wainer, Niagara Falls, N. Y., assignor to The Titanium Alloy Manufacturing Company, New York, N. Y., a corporation of Maine Application April 1, 1940, Serial No. 327,221

5 Claims. (Cl. 72—35)

This invention relates to refractories, and more particularly to refractories suitable for extremely high temperature work, and other special purposes.

In the field of special refractory materials zircon ($ZrSiO_4$) is becoming of ever increasing importance commercially for a variety of reasons, such as extremely high melting point, strength at high temperatures, acid character, etc. Zircon is of particular value in the smelting of certain acid glasses of the high silica type, in which field, in particular, the material is preeminent. However due to the expense and the weight of the material it is highly desirable that, wherever possible, ordinary firebrick materials be used as backings, supports and pillars behind a zircon structure, providing said firebrick supports are not directly exposed to the excessive temperatures or slag actions of the batch. Such a procedure leads to considerable economy in furnace construction plus the advantage of zircon in the critical zones of high temperature plus corrosive slag actions. Unfortunately, however, this completely desirable artifice has not been possible up to the present where the temperature of the joint or point of contact between the zircon structure and the ordinary super duty firebrick exceeded 2700° to 2800° F., due to breakdown at this point of contact. Since much of the refractory application of zircon is at a temperature range between 2700° and 3500° F., the problem is seen to be a serious one. When, for example, a zircon brick backed with an insulating firebrick is employed in high temperature work, there is a tendency, due to the relatively high thermal conductivity of zircon, for the temperature at the interface between the zircon brick and the insulator to rise to such an extent that failure of the composite takes place, even though the temperature at this point is well below the melting point of either zircon or insulator.

It is therefore an object of this invention to secure a refractory construction which combines the desirable characteristics of zircon with the inexpensiveness of alumino-silicate (e. g., fireclay) and other refractories. Other objects will appear hereinafter.

These objects are accomplished by providing a layer of zirconia ($ZrO_2$) between zircon and an aluminosilicate or other similar refractory.

In the drawing:

Fig. 1 illustrates a cross section of a refractory structure embodying this invention; and Fig. 2 illustrates a cross section of another form of the invention, embodied in a single composite brick.

When zircon and certain other refractory materials are brought into contact at a relatively high temperature, it has been found that fluid eutectics of relatively low melting points are formed. Zircon forms eutectics of this nature with the oxides, silicates and carbonates of the alkalis, alkaline earths, magnesium and aluminum. These fluid eutectics form at temperatures varying from 2400° to 2800° F. and they form on simple contact of the two structures. For example a small piece of shaped mullite refractory having a melting point of approximately 3280° F. is laid on a zircon brick having a melting point of 4000° F. and the assembly heated to 2700° to 2800° F. At this temperature the interface between the zircon and mullite becomes fluid and the mullite is rapidly and progressively destroyed by continued formation of the low melting eutectic. The final result is a limpid pool of slag in the face of the zircon brick which continues melting its way through the zircon brick until failure results. Essentially the same result is secured when a magnesite brick is heated in contact with zircon.

In accordance with this invention, the formation of this eutectic is prevented by interposing between the zircon structure and the fireclay or similar refractory structure a thin continuous layer of refractory zirconium dioxide or refractory cement of zirconium dioxide containing at least 95% zirconium dioxide. This layer need only be thick enough to prevent any actual contact of the zircon and aluminosilicate. The artifice is effective not only for composite structures of zircon bricks and aluminosilicate bricks but also in the case of facing cements. Many refractories suitable for use at 3000° F. would have their usefulness widely extended at 3000° F. service except for slag or mechanical actions which are strongly corrosive or erosive at 3000° F. A case in point is insulating firebrick, whose porous nature makes it susceptible to destruction even by such a force as the gas-air blast of the heating source. By first facing with a thin layer of zirconia and covering with a layer of zircon cement of suitable composition a hard tough durable super refractory facing is obtained which greatly increases the life and utility of such insulating firebrick.

Referring to the drawing, a composite structure consisting of zircon bricks and aluminosilicate bricks is illustrated in Fig. 1. In this figure, the numerals 5 represent zircon bricks directly exposed to a high temperature on face 6. On the opposite face 7 is a thin layer of zirconia 8, and on the opposite side of the layer 8 are insulating firebricks 9. The structure is held together by a suitable cement 14 of any convenient thickness, between adjacent fireclay bricks. The zircon bricks are also preferably firmly united by a suitable zircon cement 15.

Fig. 2 represents a single composite brick mainly comprising fireclay, indicated at 10, provided with successive layers of zirconia (indicated at 11) and zircon (indicated at 12). To make sure that there is no contact between the fireclay 10 and the zircon 12, the zirconia layer 11 is extended around the edge of the fireclay, as at 13.

Where the structure is such that the bricks composing said refractory structure are normally laid up dry (i.e., without cement) and the joint is not exposed to slag action or a flame blast, the protective zirconia layer may be simply the pure refractory powdered zirconia. Where the joint is subject to slag action, mechanical forces such as abrasion or vibration, or where the structure must be tight, both the zirconia and the zircon cements when used together are compounded so that on firing they form hard mutually compatible masses. To secure this result, it has been found desirable to employ bonding agents which are suitable for tightly bonding both zircon and zirconia and which are also suitable and satisfactory for bonding such structures to each other. For example, bonding agents which form refractory masses with both zircon and zirconia are sodium fluosilicate, boric acid, bentonite, boric acid plus bentonite, phosphoric acid plus sodium fluosilicate, certain low melting point glasses, phosphoric acid, and sodium silicate. The low melting point glasses are prepared by remelting soda lime glass cullet with 5% to 20% boric acid, fritting and grinding to a powder.

Whenever a zircon cement is to be laid directly over a zirconia cement the same bond is preferably used in both materials. For example, if 3% sodium fluosilicate is used to bond the zirconia the overlying zircon is also bonded with 3% sodium fluosilicate, etc.

The refractory zirconia employed in this invention is preferably the type commercially referred to as electrically fused, which is a dense highly heat shrunk zirconia available in a wide variety of mesh sizes.

Having described the invention generally, I now give the following examples:

*Example 1*

Electrically fused zirconia, minus 200 mesh in size, is formed as a refractory cement by adding 3% sodium fluosilicate, or 1% to 2% boric acid, or 0.5% to 1.0% bentonite, or a mixture of 1% boric acid plus 0.5% bentonite, or 3% phosphoric acid plus 2% sodium fluosilicate, or 2% to 4% low melting point glass, or 3% phosphoric acid, or 1% sodium silicate. A small quantity of a dispersing agent, such as 0.01% gelatine or dextrine, is added. The composition is applied as a cement between a zircon brick and a fireclay brick by adding water and brushing, troweling, dipping or spatulating in the usual manner, in a layer $\frac{1}{32}$ inch thick. The cement is dried and the structure fired at a temperature of 2400° to 2600° F. Such a structure can be heated to the usual softening point of the aluminosilicate without any formation of the fluid eutectic taking place which normally causes failure.

*Example 2*

A zirconia composition as in Example 1 is applied as in Example 1 as a thin first coat directly against an insulating firebrick, such a coat being usually applied either with a brush or by dipping. A zircon composition comprising a mixture of equal proportions of minus 325 mesh zircon and 100 mesh granular zircon is mixed with the same amount and kind of bonding agent as are used for the zirconia. This composition is also applied as a cement directly over the zirconia coat, in the same fashion as the zirconia, in as thick a layer as desired (e. g., $\frac{1}{16}$ inch). The composite brick thus obtained is fired at a temperature of 2400° to 2600° F.

By the employment of the present invention, eutectic formation is prevented entirely to such an extent that a firebrick may be brought up to its actual softening temperature in direct contact with a zircon brick and the zircon brick will remain completely unaffected. In one case a mullite brick was pressed against a zircon brick (provided with a thin layer of zirconia) with a load of 25 pounds per square inch and the assembly heated to 3000° F. No fusion could be detected at the interface.

Although the invention has been described with respect to aluminosilicate refractories such as fireclay, it is understood that other refractory oxides, carbonates and silicates of alkali metals, alkaline earth metals, magnesium and aluminum may be combined with zircon in the same way. Examples of such materials are magnesite, baryta, dolomite and lime. However, the invention finds its greatest utility in its application to fireclay refractories, because of the relative abundance and cheapness of the latter material.

As many variations are possible within the scope of this invention, it is not intended to be limited except as defined by the appended claims.

I claim:

1. A refractory structure comprising zircon, a refractory material taken from the class consisting of oxides, silicates and carbonates of alkali metals, alkaline earth metals, magnesium and aluminum, and a continuous layer of zirconium oxide constituting a barrier between said zircon and said refractory material, whereby formation of an eutectic between said zircon and said refractory material is prevented.

2. A refractory structure comprising zircon, an aluminosilicate refractory, and a continuous layer of zirconium oxide constituting a barrier between said zircon and said aluminosilicate, whereby formation of an eutectic between said zircon and said aluminosilicate refractory is prevented.

3. A refractory structure comprising a refractory material taken from the class consisting of oxides, silicates and carbonates of alkali metals, alkaline earth metals, magnesium and aluminum, a continuous layer of zirconium oxide on one face of said refractory material and overlapping on the adjacent faces of said refractory material, and a zircon layer superimposed upon said zirconium oxide layer, said zircon layer at no point being in contact with said refractory material, whereby formation of an eutectic between said zircon and said refractory material is prevented.

4. A refractory structure comprising an aluminosilicate refractory, a continuous layer of zirconium oxide on one face of said aluminosilicate refractory and overlapping on the adjacent faces of said aluminosilicate refractory, and a zircon layer superimposed upon said zirconium oxide layer, said zircon layer at no point being in contact with said aluminosilicate refractory, whereby formation of an eutectic between said zircon and said aluminosilicate refractory is prevented.

5. A refractory structure comprising an aluminosilicate refractory, a continuous layer of zirconium oxide containing a bonding agent on one face of said aluminosilicate refractory and overlapping on the adjacent faces of said aluminosilicate refractory, and a zircon layer containing the same bonding agent as said first mentioned layer superimposed upon said zirconium oxide layer, said zircon layer at no point being in contact with said aluminosilicate refractory, whereby formation of an eutectic between said zircon and said aluminosilicate refractory is prevented.

EUGENE WAINER.